United States Patent
Higuchi (10) Patent No.: US 7,463,963 B2
(45) Date of Patent: Dec. 9, 2008

(54) TURNING MOTION CONTROL FOR VEHICLE

(75) Inventor: Takuya Higuchi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 157 days.

(21) Appl. No.: 11/180,695

(22) Filed: Jul. 14, 2005

(65) Prior Publication Data

US 2006/0015239 A1     Jan. 19, 2006

(30) Foreign Application Priority Data

Jul. 16, 2004 (JP) .............................. 2004-210157

(51) Int. Cl.
  B60T 8/00 (2006.01)
  B60T 7/12 (2006.01)
  G06F 7/00 (2006.01)

(52) U.S. Cl. ............................. 701/70; 701/72; 701/78; 303/167

(58) Field of Classification Search .................. 701/72, 701/1, 36, 38, 41, 48, 49, 70, 76, 78, 79, 701/82, 83, 84, 91, 92, 93; 303/140, 146, 303/147, 167, 121, 154
See application file for complete search history.

(56) References Cited

U.S. PATENT DOCUMENTS

| | | | | |
|---|---|---|---|---|
| 4,898,431 A | * | 2/1990 | Karnopp et al. | 303/146 |
| 4,998,593 A | * | 3/1991 | Karnopp et al. | 180/408 |
| 5,189,619 A | * | 2/1993 | Adachi et al. | 701/96 |
| 5,206,808 A | * | 4/1993 | Inoue et al. | 701/72 |
| 5,282,674 A | * | 2/1994 | Matsuda | 303/9.71 |
| 5,315,295 A | * | 5/1994 | Fujii | 340/936 |
| 6,076,034 A | | 6/2000 | Satoh et al. | |
| 6,212,465 B1 | * | 4/2001 | Sielagoski et al. | 701/96 |
| 6,219,610 B1 | * | 4/2001 | Araki | 701/72 |
| 6,272,416 B1 | | 8/2001 | Kuroda et al. | |
| 6,424,904 B1 | * | 7/2002 | Takahashi et al. | 701/70 |
| 2003/0163238 A1 | * | 8/2003 | Matsumoto et al. | 701/70 |

FOREIGN PATENT DOCUMENTS

| | | |
|---|---|---|
| DE | 198 30 318 A1 | 1/1999 |
| DE | 199 05 034 A1 | 9/1999 |
| JP | 2-171373 A | 7/1990 |
| JP | 5-16699 A | 1/1993 |
| JP | 2600876 B2 | 1/1997 |
| JP | 2001-63541 A | 3/2001 |

OTHER PUBLICATIONS

U.S. Appl. No. 11/144,610, Higuchi et al., filed Jun. 6, 2005.
U.S. Appl. No. 11/143,573, Ishimoto, filed Jun. 3, 2005.
U.S. Appl. No. 11/138,312, Higuchi, filed May 27, 2005.

* cited by examiner

*Primary Examiner*—Jack W Keith
*Assistant Examiner*—Edward Pipala
(74) *Attorney, Agent, or Firm*—Foley & Lardner LLP

(57) ABSTRACT

A vehicle turning motion control apparatus includes a turning condition sensor to sense a turning condition of the vehicle; and a controller to start a decelerating control to produce the braking force with a brake actuator when the turning condition surpasses a deceleration start threshold. There is further provided an accelerator operation quantity sensor to sense a driver's accelerator operation quantity. The controller adjusts the deceleration start threshold toward the turning performance limit when the accelerator operation quantity increases, and to start a preload or preliminary pressure control to produce a preload before the deceleration control when the turning condition surpasses a preload start threshold.

15 Claims, 9 Drawing Sheets

PRELIMINARY PRESSURE START — END

FIG.11

WIDER CLEARANCE

TURNING MOTION CONTROL FOR VEHICLE

BACKGROUND OF THE INVENTION

The present invention relates to apparatus and/or process for performing an automatic deceleration control to ensure stable tuning motion of a vehicle in accordance with a vehicle turning condition.

A Japanese patent 2600876 (JP-A-H02-171373) shows a vehicle control system for producing a braking force automatically when a vehicle turning condition approaches a limit of a stable cornering performance range. A published Japanese patent application 2001-63541 shows a brake control system arranged to perform an automatic braking operation when a target wheel cylinder pressure exceeds a first threshold, and to produce a preload pressure to improve a control response.

SUMMARY OF THE INVENTION

When a driver depresses an accelerator pedal with the intension of approaching a turning performance limit of the vehicle, a brake control system of such a type functions to inhibit further acceleration of the vehicle by starting an automatic deceleration control. Therefore, the control system may be arranged to vary a deceleration control start threshold toward the turning performance limit in accordance with a driver's acceleration intention, and thereby to allow the driver to approach the limit. However, in this case, if the accelerator pedal is released abruptly, the deceleration control start threshold decreases sharply, the vehicle turning speed exceeds the threshold and the deviation increases abruptly, the control system is unable to start the deceleration control responsively. It is therefore an object of the present invention to provide vehicle control apparatus and/or process for allowing an approach to the turning performance limit and improving the control response with a preload control.

According to one aspect of the present invention, a vehicle turning motion control apparatus comprises: a brake actuator configured to produce a braking force; a turning condition sensor configured to sense a turning condition of the vehicle; an accelerator operation quantity sensor configured to sense an accelerator operation quantity of a driver; and a controller configured, to start a decelerating control to produce the braking force with the brake actuator when the turning condition surpasses a deceleration start threshold which is set to start the deceleration control before a turning performance limit of the vehicle is reached, to vary the deceleration start threshold from a normal value toward the turning performance limit when the accelerator operation quantity increases, and to start a preload control to produce a preload before the deceleration control when the turning condition surpasses a preload start threshold which is set to the normal value even if the accelerator operation quantity increases.

According to another aspect of the invention, a vehicle turning motion control process comprises: sensing a turning condition of the vehicle; decelerating the vehicle by starting a deceleration control when the turning condition crosses a deceleration start threshold from a first side to a second side of the deceleration start threshold which is set to have a margin for starting the deceleration control before a turning performance limit of the vehicle is reached; varying the deceleration start threshold from a normal value toward the turning performance limit when a driver's accelerator operation quantity increases; and starting a preload control to produce a preload before the deceleration control when the turning condition crosses a preload start threshold from a first side to a second side of the preload start threshold which is set to the normal value even if the driver's accelerator operation quantity increases.

According to still another aspect of the present invention, a vehicle turning motion control apparatus comprises: turning condition sensing means for sensing a turning condition of the vehicle; deceleration control means for decelerating the vehicle by starting a deceleration control when the turning condition crosses a deceleration start threshold from a first side to a second side of the deceleration start threshold which is set to have a margin for starting the deceleration control before a turning performance limit of the vehicle is reached; accelerator input sensing means for sensing a driver's accelerator operation quantity; threshold adjusting means for varying the deceleration start threshold from a normal value toward the turning performance limit when the driver's accelerator operation quantity increases; and preload control means for starting a preload control to produce a preload before the deceleration control when the turning condition crosses a preload start threshold from a first side to a second side of the preload start threshold which is set to the normal value even if the driver's accelerator operation quantity increases.

DETAILED DESCRIPTION OF THE INVENTION

Figure 1:
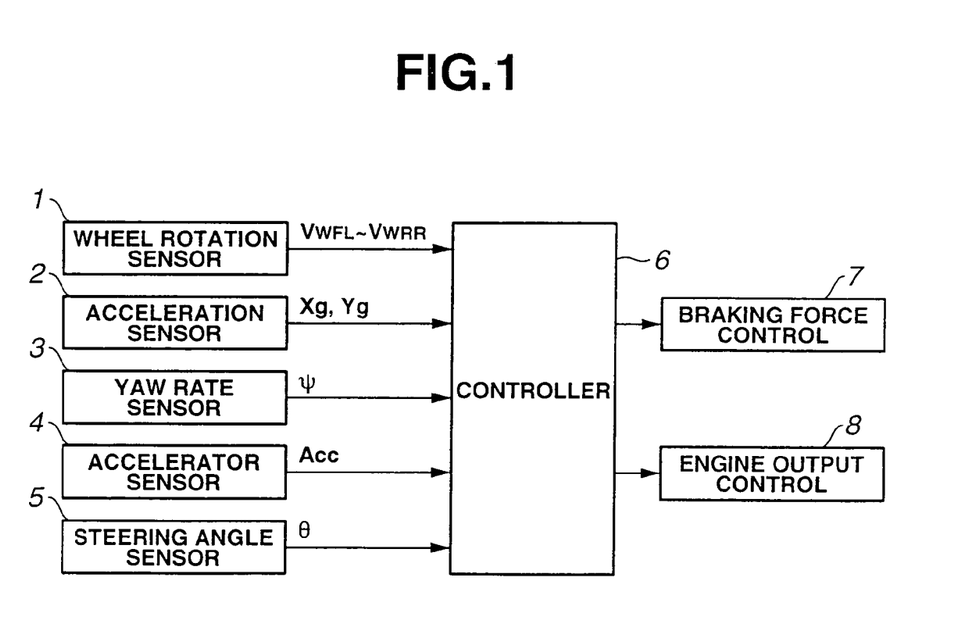
FIG. 1 is a block diagram showing a vehicle turning motion control system or apparatus according to one embodiment of the present invention.

FIG. 1 shows, in a block diagram, a vehicle turning (or cornering) motion control system or apparatus according to one embodiment of the present invention. A wheel rotation sensor (or wheel speed sensor) 1 is a group of sensing devices for sensing wheel speeds $V_{WFL}$~$V_{WRR}$ of the front and rear wheels of a vehicle, respectively. An acceleration sensor 2 includes one or more sensing devices for sensing a longitudinal acceleration Xg and a lateral acceleration Yg of the vehicle. A yaw rate sensor 3 senses a yaw rate $\psi$ of the vehicle body. An accelerator sensor 4 senses an accelerator opening or position Acc of an accelerator pedal of the vehicle. A steering angle sensor 3 senses a steering angle θ of a steering wheel of the vehicle. A sensor section including these sensors is connected with a controller 6 which includes a microcomputer in this example. Input information collected by the sensor section is supplied to controller 6.

Figure 4:
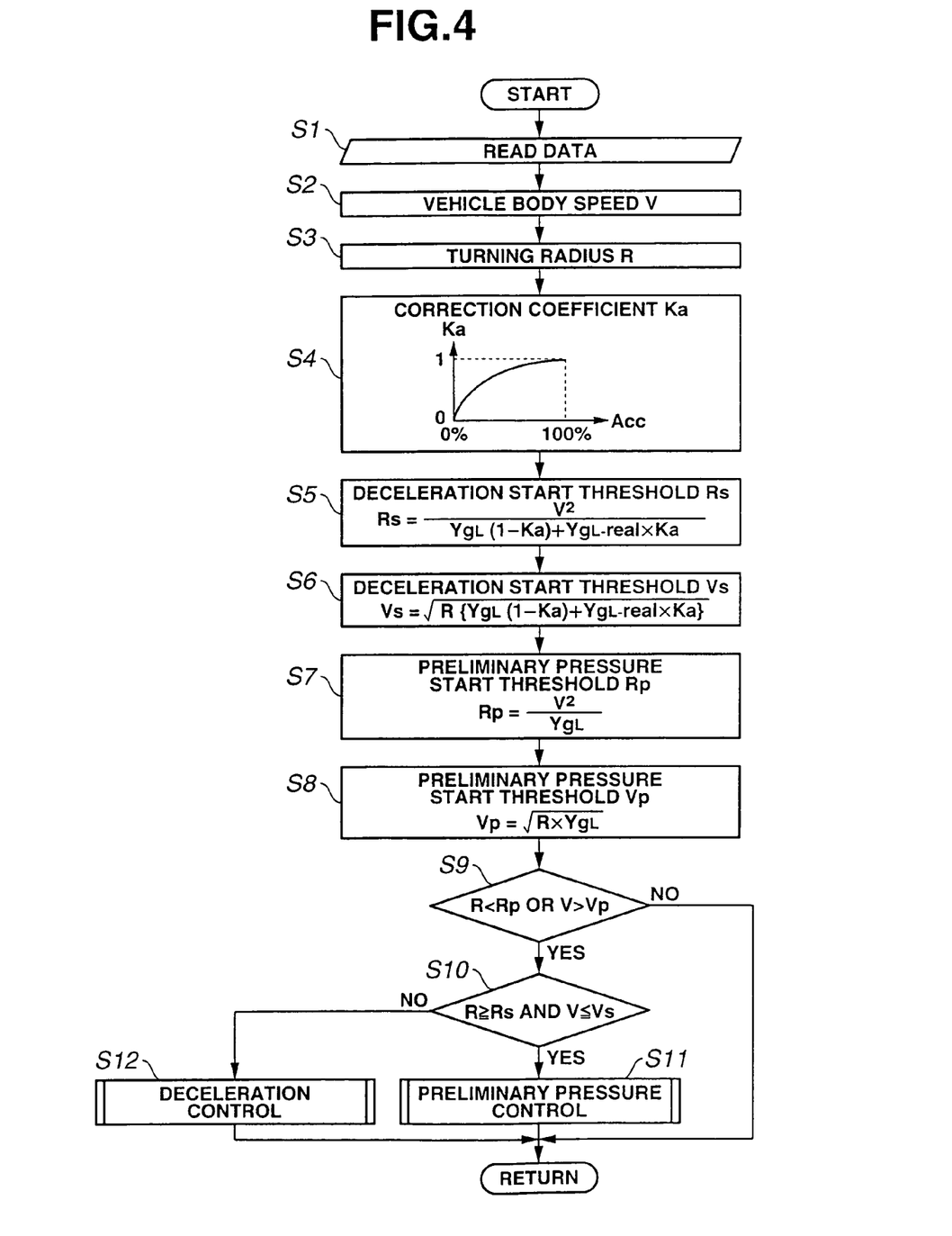
FIG. 4 is a flowchart showing a vehicle turning motion control process performed by a controller of the control system shown in FIG. 1.

Controller 6 performs a vehicle turning motion control process (as shown in FIG. 4) by using the signals supplied from the sensors, and thereby controls an actuating section which, in this example, includes a braking force control actuator 7 and an engine output control actuator 8, to perform an automatic deceleration control in accordance with a vehicle turning condition. Engine output control actuator 8 of this example is arranged to control the engine output (engine speed and torque) by regulating one or more of the opening degree of a throttle valve, a fuel injection quantity and an ignition timing.

Figure 2:
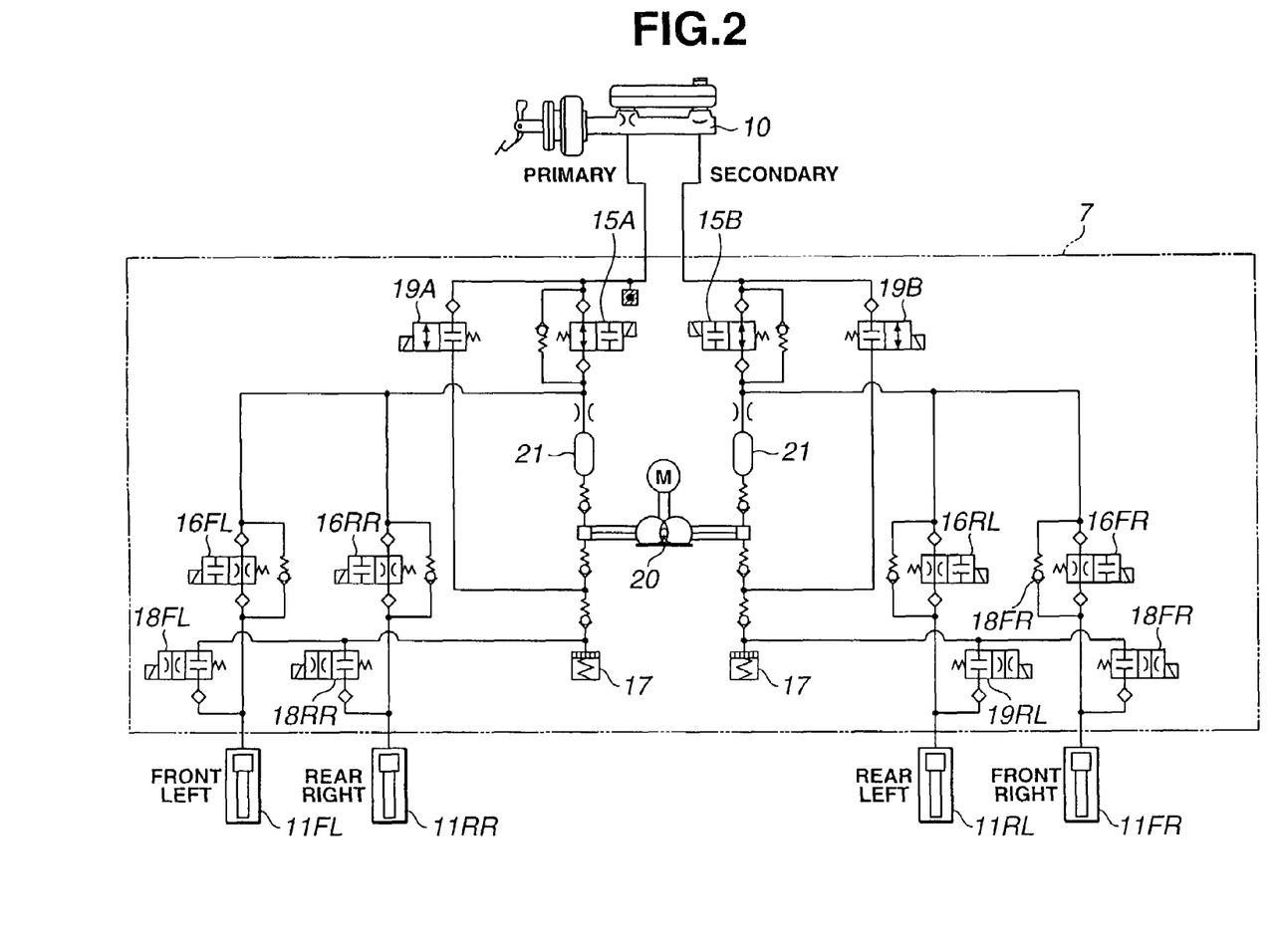
FIG. 2 is a hydraulic circuit diagram showing a braking force control actuator of the control system of FIG. 1.

Braking force control actuator 7 of this example is an actuating system utilizing a hydraulic brake fluid pressure control circuit which can be used for antiskid brake control (ABS), traction control (TCS) and stability control (VDC: Vehicle Dynamic Control). As shown in FIG. 2, the pressure control circuit of this example is connected between a master cylinder 10 and a wheel cylinder group 11FL~11RR, and arranged to control the brake fluid pressure of each wheel cylinder in a pressure increase mode, a pressure hold mode and a pressure decrease mode, without regard to a driver's brake operation.

In the example shown in FIG. 2, master cylinder 10 is a tandem type master cylinder arranged to produce two brake fluid pressures for two systems, in accordance with a pedal depressing force of the driver. The system of FIG. 2 employs a diagonal split type in which a primary side is connected to front left and rear right wheel cylinders 11FL and 11RR, and a secondary side is connected to front right and rear left wheel cylinders 11FR and 11RL. However, instead of the diagonal split type, it is optional to employ a front-rear split type separating the front left and right pair and the rear left and right pair.

Figure 3:
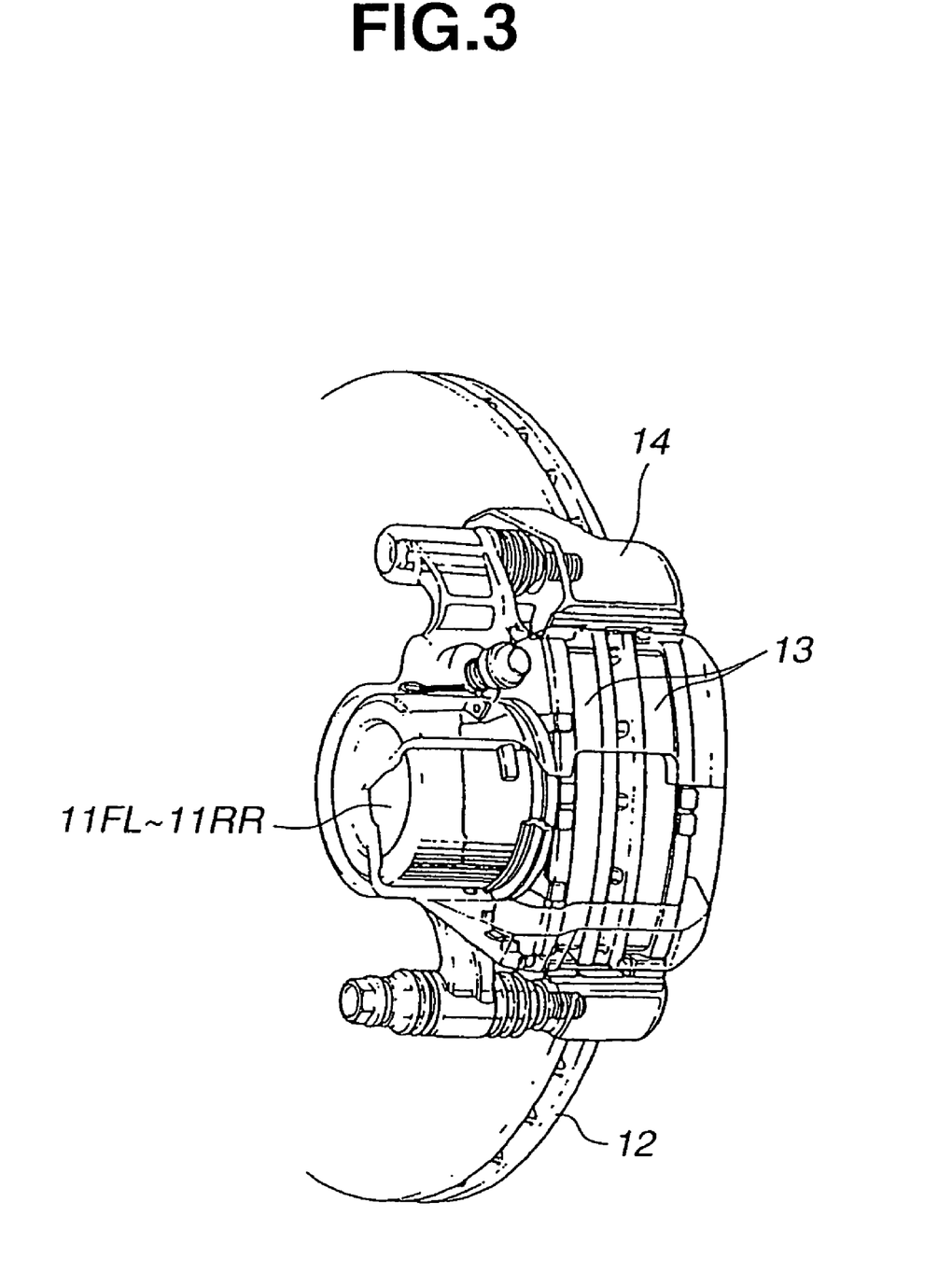
FIG. 3 is a perspective view showing a caliper in a disc brake employed in the control system shown in FIGS. 1 and 1.

In this example, each of wheel cylinders 11FL~11RR is a cylinder actuator in a disc brake. As shown in FIG. 3, each wheel cylinder is installed in a single piston type caliper 14 arranged to clamp a ventilated type disc rotor 12 with a pair of brake pads 13. It is optional to employ a solid disc instead of the ventilated disc, and to employ a caliper of a confronting piston type or a dual piston type instead of the single piston type.

As shown in FIG. 2, the hydraulic circuit section on the primary side includes: a normally-open type first gate valve 15A capable of closing a fluid passage from master cylinder 10 to wheel cylinders 11FL and 11RR; normally-open type inlet valves 16FL and 16RR arranged to close fluid passages, respectively, from first gate valve 15A to wheel cylinders 11FL and 11RR; an accumulator 17 connected to a point between wheel cylinder 11FL and inlet valve 16FL and a point between wheel cylinder RR and inlet valve 16RR; normally-closed outlet valves 18FL and 18RR arranged to open fluid passages, respectively, from wheel cylinders 11FL and 11RR to accumulator 17; and a normally-closed type second gate valve 19A capable of opening a fluid passage between a point between master cylinder 10 and first gate valve 15A and a point between accumulator 17 and outlet valves 18FL and 18RR. A pump 20 includes a suction side connected with a point between accumulator 17 and outlet valve 18FL and 18RR, and a discharge side connected with a point between first gate valve 15A and inlet valves 16FL and 16RR. On the discharge side of pump 20, there is provided a damper chamber 21 for restraining pulsation of the discharge brake fluid pressure and weakening pedal vibrations.

Like the primary side, the hydraulic circuit section on the secondary side includes: a first gate valve 15B; inlet valves 16FR and 16RL; an accumulator 17; outlet valves 18FR and 18RL; and a second gate valve 19B, and a damper chamber 21. Pump 20 is connected with the circuit on the secondary side in the same manner as in the circuit on the primary side.

Each of first gate valves 15A and 15B, inlet valves 16FL~16RR, outlet valves 18FL~18RR, and second gate valves 19A and 19B is a 2-port, 2-position, single solenoid, spring-offset type solenoid-operated valve. Each of first gate valves 15A and 15B, and inlet valves 16FL~16RR is arranged to open the corresponding fluid passage normally in a deenergized normal position. Each of outlet valves 18FL~18RR and second gate valves 19A and 19B is arranged to close the corresponding fluid passage normally in the deenergized normal position. However, it is possible to employ an arrangement in which first gate valves 15A and 15B, and inlet valves 16FL~16RR are arranged to open in an energized offset position, and output valves 18FL~18RR and second gate valves 19A and 19B are arranged to close in the energized offset position.

Each accumulator 17 is a spring type accumulator in which a compression spring confronts a piston in a cylinder. As an accumulator for temporarily storing a brake fluid drained from each wheel cylinder and thereby facilitating the pressure decrease operation, it is possible to employ various accumulators other than the spring type. For example, it is possible to employ a plumb type, a gas compression direct pressure type, a piston type, a metal bellows type, a diaphragm type, a bladder type and an inline type. In this example, pump 20 is a volumetric type pump such as a gear pump, a vane pump and a piston pump, capable of providing an approximately constant discharge quantity irrespective of a load pressure. Instead of pump, it is optional to employ a power piston.

The thus-constructed brake system is operated in the following manner. In the following example, the primary side is taken as an example. When first gate valve 15A, inlet valve 16FL (16RR), outlet valve 18FL (18RR) and second gate valve 19A are all in the deenergized normal position, the brake fluid pressure is supplied directly from master cylinder 10 to wheel cylinder 11FL (11RR), and the brake system is operated in the normal brake mode.

Even if the brake pedal is in the released state, the control system can increase the wheel cylinder pressure of wheel cylinder 11FL (11RR) by leaving input valve 16FL (16RR) and outlet valve 18FL (18RR) in the deenergized state, closing first gate valve 15A by energization, opening second gate valve 19A by energization, and driving pump 20 so that the fluid pressure in master cylinder 10 is sucked through second gate valve 19A, and the discharged fluid pressure is supplied through inlet valve 16FL (16RR) to wheel cylinder 11FL (11RR).

By closing inlet valve 16FL (16RR) by energization while first gate valve 15A, outlet valve 18FL (18RR) and second gate valve 19A are in the deenergized state, the control system can hold the fluid pressure of wheel cylinder 11FL (11RR) in the state shutting off the passages from wheel cylinder 11FL (11RR) to master cylinder 10 and accumulator 17.

By closing inlet valve 16FL (16RR) by energization and opening outlet valve 18FL (18RR) by energization while first gate valve 15A and second gate valve 19A are in the deenergized state, the control system can decrease the fluid pressure of wheel cylinder 11FL (11RR) in the state allowing the fluid pressure of wheel cylinder 11FL (11RR) to flow into accumulator 17. The fluid pressure in accumulator 17 is returned by pump 20, to master cylinder 10.

On the secondary side, too, the control system can allow the normal brake mode, and the pressure increase mode, pressure hold mode and pressure decrease mode in the same manner on the primary side as explained above. Thus, controller 6 can increase, hold and decrease the fluid pressure in each wheel cylinder by controlling first gate valve 15A and 15B, inlet valves 16FL~16RR, outlet valve 18FL~18RR, second gate valves 19A and 19B and pump 20.

FIG. 4 shows the turning motion control process performed by controller 6 at regular time intervals of a predetermined time (10 msec, in this example) as timer interrupt routine.

At step S1, controller 6 reads input information of the signals from the sensors. In this example, the input information includes the wheel speeds V $_{WFL}$~V $_{WRR}$ from the wheel speed sensor 1; the longitudinal acceleration Xg and lateral acceleration Yg from acceleration sensor 2; the yaw rate $\psi$ from yaw rate sensor 3, the accelerator opening Acc from accelerator sensor 4, and the steering wheel angle $\theta$ from steering angle sensor 5. Then, at next step S2, controller 6 calculates a vehicle body speed V. It is possible to calculate the vehicle body speed V from the wheel speeds V$_{WFL}$~V$_{WRR}$ and longitudinal acceleration Xg. At step S3 following S2, controller 6 calculates a current vehicle turning radius R from vehicle body speed (or vehicle turning speed) V and lateral acceleration Yg according to the following equation (1).

$$R = V^2/Yg \tag{1}$$

In this example, vehicle turning radius R is calculated from turning speed V and lateral acceleration Yg. However, the method of calculating turning radius R is not limited to this. It is optional to calculate the vehicle turning radius R by taking account of steering angle $\theta$ or yaw rate $\psi$ to improve the accuracy.

Figure 5:
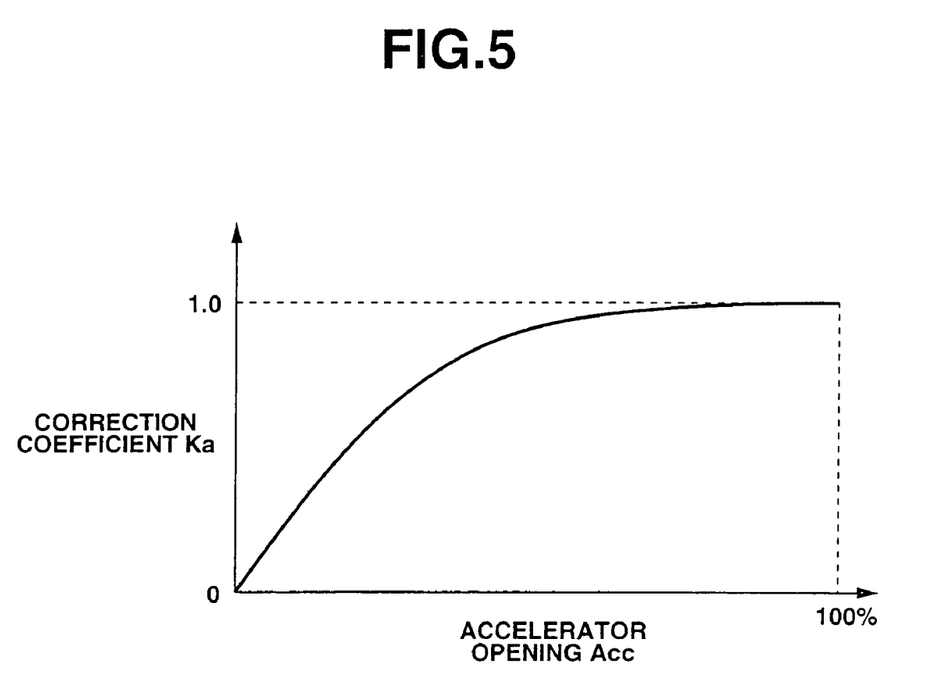
FIG. 5 is a graphic view showing a control map for calculating a correction coefficient Ka in the control process of FIG. 4.

At step S4, controller 6 calculates a correction quantity Ka in accordance with accelerator opening Acc, by using a control map shown in FIG. 5. Correction quantity Ka is a quantity used for calculating Rs and Vs as mentioned later. In this example, correction quantity Ka is a correction coefficient. As shown in FIG. 5, correction coefficient Ka is equal to zero when accelerator opening Acc is 0%. Correction coefficient Ka increases from zero to one monotonically as accelerator opening Acc increases from 0% to 100%.

At step S5, controller 6 calculates a deceleration start turning radius threshold Rs used as a threshold of the turning radius R to start the automatic deceleration control, in accordance with the turning speed V and correction coefficient Ka according to the following equation (2).

$$Rs = \frac{V^2}{Yg_L(1-Ka) + (Yg_{L\text{-}real} \cdot Ka)} \tag{2}$$

In this equation, Yg$_L$-real is an actual limit lateral acceleration enabling stable turning motion which is determined by vehicle specification data items. Yg$_L$ is a virtual limit lateral acceleration determined by multiplying the limit lateral acceleration Yg$_L$-real by a predetermined coefficient smaller than one (0.9, for example) to provide a margin between Rs and the turning performance limit.

When accelerator opening Acc is 0% and correction coefficient Ka is equal to zero, Rs=V$^2$/Yg$_L$ according to equation (2). When accelerator opening Acc is 100% and correction coefficient Ka is equal to one, Rs=V$^2$/Yg$_L$-real. As accelerator opening Acc is increased, this control system decreases deceleration start turning radius threshold Rs toward the turning performance limit, and thereby reduce a margin between the threshold Rs and the limit so that the automatic deceleration control becomes difficult to be triggered.

At a next step S6, controller 6 calculates a deceleration start turning speed threshold Vs used as a threshold of the turning speed V to start the automatic deceleration control, in accordance with the turning radius R and correction coefficient Ka according to the following equation (3).

$$Vs = \sqrt{R\{Yg_L(1-Ka)+Yg_{L\text{-}real} \cdot Ka\}} \tag{3}$$

When accelerator opening Acc is 0% and correction coefficient Ka is equal to zero, Vs=$\sqrt{(R \cdot Yg_L)}$ according to equation (3). When accelerator opening Acc is 100% and correction coefficient Ka is equal to one, Vs=$\sqrt{(R \cdot Yg_L\text{-real})}$. As accelerator opening Acc is increased, this control system increases deceleration start vehicle speed threshold Vs toward the turning performance limit, and thereby reduce a margin between the threshold Vs and the limit so that the automatic deceleration control becomes difficult to be triggered.

Then, at a step S7, controller 6 calculates a preliminary pressure or preload start turning radius threshold Rp. In this example, according to the following equation (4), preliminary pressure or preload start turning radius threshold Rp is set equal to a (normal) value of the deceleration start turning radius threshold Rs in the case in which there is no accelerator operation, the accelerator opening Acc is 0%, and hence correction quantity Ka is zero.

$$Rp = V^2/Yg_L \tag{4}$$

Then, at a step S8, controller 6 calculates a preliminary pressure or preload start turning speed threshold Vp. In this example, according to the following equation (5), preliminary pressure or preload start turning speed threshold Vp is set equal to a (normal) value of the deceleration start turning speed threshold Vs in the case in which there is no accelerator operation, the accelerator opening Acc is 0%, and hence correction quantity Ka is zero.

$$Vp = \sqrt{(R \cdot Yg_L)} \tag{5}$$

At a next step S9, controller 6 examines whether the current turning radius R is smaller than the preliminary pressure or preload start radius threshold Rp determined at S7, or the current turning speed V is higher than the preliminary pressure or preload start speed threshold Vp determined at S8. When current turning radius R is greater than or equal to Rp (R≧Rp) and at the same time the current turning speed V is lower than or equal to Vp (V≦Vp), then controller 6 terminates the process of FIG. 4 directly after S9 and returns to a main program on the assumption that the automatic braking does not become necessary even if the driver returns the accelerator opening Acc to 0% abruptly because turning radius R is greater than or equal to threshold Rs, and turning speed V is lower than or equal to threshold Vs.

When, on the other hand, at least one of the first condition (R<Rp) and the second condition (V>Vp) is met, the controller 6 proceeds to step S10 on the assumption that the automatic braking becomes adequate or necessary if the driver returns the accelerator opening Acc to 0% abruptly because turning radius R becomes smaller than threshold Rs, or turning speed V becomes higher than threshold Vs.

At next step S10, controller 6 examines whether the current turning radius R is equal to or greater than the deceleration start radius threshold Rs determined at S5, and at the same time the current turning speed V is lower than or equal to the deceleration start speed threshold Vs determined at S6. When the current turning radius R is greater than or equal to Rs (R≧Rs) and at the same time the current turning speed V is lower than or equal to Vs (V≦Vs), then controller 6 proceeds to step S11 to perform a preliminary pressure or preload control shown in FIG. 6, and then returns to the main program, on the assumption that the vehicle can still maintain a stable turning operation. When at least one of the first condition (R<Rs) and the second condition (V>Vs) is met, the controller 6 proceeds to step S12 on the assumption that the vehicle turning state approaches the turning ability limit and the automatic deceleration is appropriate. In this case, controller 6 performs a deceleration control shown in FIG. 7 and thereafter returns to the main program.

Figure 6:
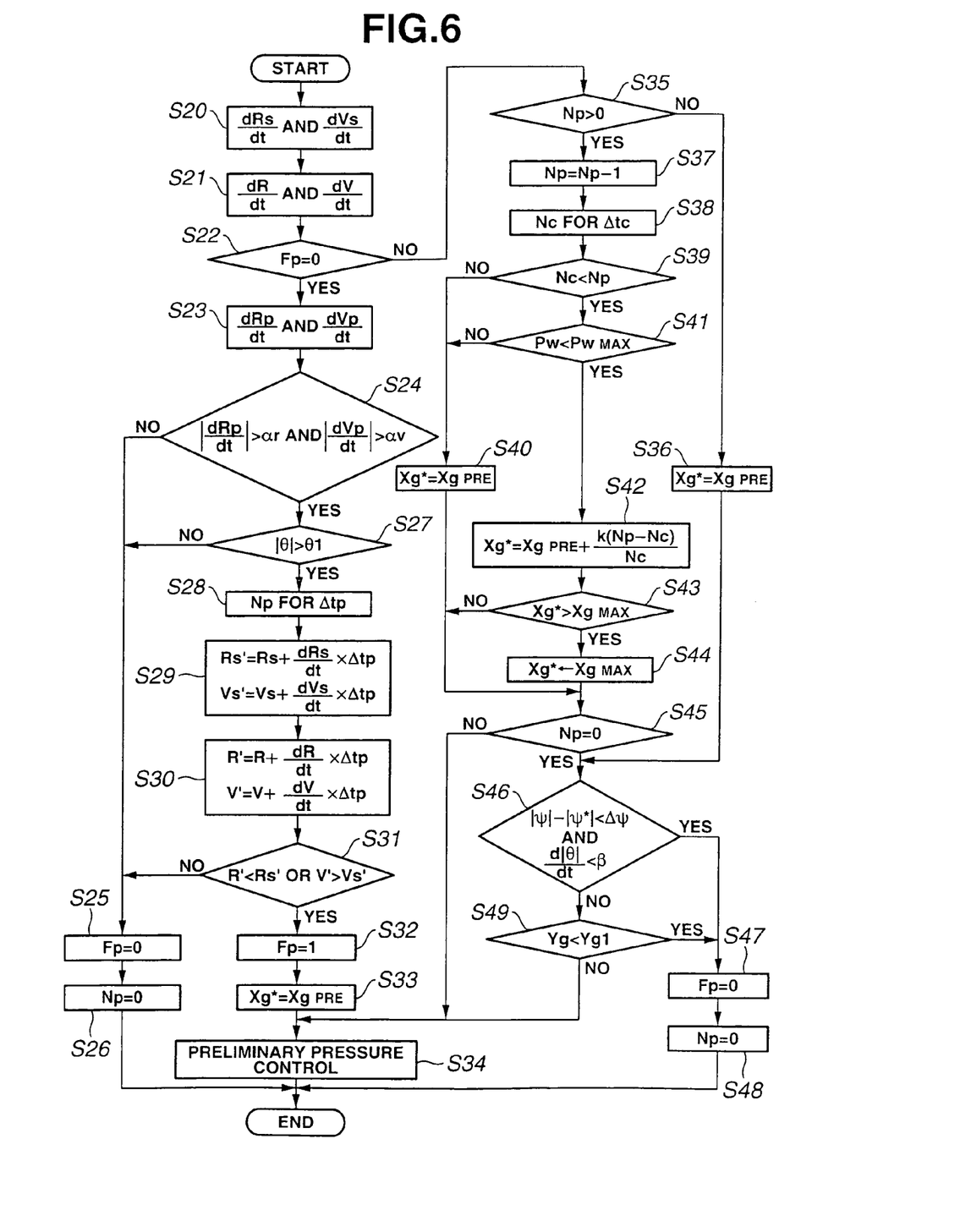
FIG. 6 is a flowchart showing a preload (preliminary pressure) control process of a step S11 of FIG. 3.

FIG. 6 shows the preliminary pressure or preload control process performed at S11.

At a step S20 of FIG. 6, controller 6 calculates a variation speed (or time rate of change) dRs/dt of deceleration start radius threshold Rs, and a variation speed (or time rate of change) dVs/dt of deceleration start speed threshold Vs. In this example, each variation speed is determined from a difference between a current sampled value and a previous sampled value. It is optional to employ a second most recent previous value before the most recent previous value, and a weighting operation, or to employ a low-pass filtering operation. At a step S21, controller 6 calculates a variation speed (or time rate of change) dR/dt of turning radius R, and a variation speed (or time rate of change) dV/dt of turning speed V, in the same manner as in S20.

At S22, controller 6 checks whether a preliminary pressure or preload start flag Fp is equal to zero. Preload start flag Fp is a condition signal or code for indicating a start of the preload control for applying a preliminary pressure to each wheel cylinder. When Fp=0, preload start flag Fp indicates that the preload control is not yet started. When Fp=1, the flag Fp indicates that the preload control is started. From S22, controller 6 proceeds to a step S35 when Fp=1, and to a step S23 when Fp=0.

At S23, controller 6 calculates a variation speed (or time rate of change) dRp/dt of preload start radius threshold Rp, and a variation speed (or time rate of change) dVp/dt of preload start speed threshold Vp in the same manner as in S20. At a next step S24, controller 6 examines whether the absolute value of the variation speed dRp/dt of Rp is greater than a predetermined value αr, and at the same time the absolute value of the variation speed dVp/dt of Vp is greater than a predetermined value αv, to prevent undesired hunting. When |dRp/dt|>αr, and |dVp/dt|>αv, controller 6 proceeds to a step S27 on the assumption that there is no hunting. When |dRp/dt|≦αr, or |dVp/dt|≦αv, controller 6 proceeds to a step S25 on the assumption that there is a possibility of hunting.

At S25, controller 6 resets preload start flag Fp to zero (Fp=0). At a next step S26, controller 6 resets, to zero, a preload dead time count Np which is a count for corresponding to a dead time Δtp until a preliminary pressure is applied to a wheel cylinder. After S26, controller 6 terminates the preload control process of FIG. 6. At step S27, controller 6 examines whether the absolute value of steering angle θ is greater than a predetermined value θ1, in order to avoid an improper operation of the preload control. When |θ|≦θ1, controller 6 proceeds from S27 to S25 since a driver's steering operation is not such as to require the preload control prior to the deceleration control, and there is a possibility of non-necessity of preload control. When, on the other hand, |θ|>θ1, controller 6 proceeds to a next step S28 on the assumption that there is a steering operation which may require the preliminary pressure control prior to the deceleration control.

At S28, controller 6 sets the count Np corresponding to the dead time Tp of the preliminary pressure control operation until the preliminary pressure is applied to the wheel cylinder.

The dead time Tp is a time from a start of a driver control of brake force control actuator 7, to an instant at which a fluid pressure is actually produced in a wheel cylinder, and a clearance (or play) between disc rotor 12 and brake pad 13 is actually reduced. Dead time Tp is determined in advance experimentally. Conversion to count Np is performed by dividing dead time Δtp by a calculation cycle T. When, for example, Δtp=250 msec and T=10 msec, then Np=25.

At a step S29, controller 6 calculates, from current deceleration start thresholds Rs and Vs and their variation speeds dRs/dt and dVs/dt, predictive deceleration start radius threshold value Rs' and deceleration start speed threshold value Vs' after the elapse of Δtp, according to the following equations (6).

$$Rs'=Rs+(dRs/dt)\times\Delta tp$$

$$Vs'=Vs+(dVs/dt)\times\Delta tp \tag{6}$$

At a step S30, controller 6 calculates, from current turning radius and speed R and V and their variation speeds dR/dt and dV/dt, predictive turning radius R' and turning speed V' after the elapse Δtp, according to the following equations (7).

$$R'=R+(dR/dt)\times\Delta tp$$

$$V'=V+(dV/dt)\times\Delta tp \tag{7}$$

At a step S31, controller 6 determines whether the turning radius R' at the end of Δtp is smaller than the deceleration start radius threshold Rs', or the turning speed V' at the end of Δtp is higher than the deceleration start speed threshold Vs'. When R'≧Rs' and at the same time V'≦Vs', then, controller 6 proceeds from S31 to S25 on the assumption that the preliminary pressure producing operation will be finished before a start of the deceleration control. When R'<Rs' or V'>Vs', controller 6 proceeds to a step S32 on the assumption that the preliminary pressure producing preload control operation is finished in time with a start of the deceleration control.

At a step S32, controller 6 sets preload start flag Fp to one. At a next step S33, controller 6 sets a target deceleration Xg* to a predetermined small deceleration value $Xg_{PRE}$ for reducing a clearance (or play) between disc rotor 12 and brake pads 13 to produce a preliminary pressure by driving pump 20.

$$Xg^*=Xg_{PRE} \tag{8}$$

At a step S34 following S33, controller 6 calculates a target wheel cylinder pressure for each wheel cylinder required to achieve the calculated target deceleration Xg*, and controls the braking force control actuator 7 to perform the preload control to reduce the deviation of each actual wheel cylinder pressure from the target pressure. Thereafter, controller 6 terminates the preload control process of FIG. 6.

At S35 reached in the case of negative answer of S22, controller 6 examines whether count Np is greater than zero. When Np=0, controller 6 considers the preload control operation is completed, and proceeds to a step S36. At S36, controller 6 sets target deceleration Xg* to predetermined small deceleration $Xg_{PRE}$ as in S33, and then proceeds to a step S46. When, on the other hand, Np>0, controller 6 considers that the preload control operation is not completed, and proceeds to a step S37.

At S37, controller 6 decrements count Np by one.

$$Np=Np-1 \tag{9}$$

At a step S38, controller 6 estimates a time Δtc until a start of the deceleration control, and calculates a count Nc corresponding to Δtc. The estimated time (or time interval) Δtc from now to a start of the deceleration control is determined in the following manner. First, controller 6 determines a time $\Delta tcr$ until turning radius R becomes smaller than or equal to deceleration start threshold Rs, and a time $\Delta tcv$ until turning speed V becomes higher than or equal to deceleration start threshold Vs, by using the following equations (10) and (11).

$$Rs + \frac{dRs}{dt} \times \Delta tcr = R + \frac{dR}{dt} \times \Delta tcr \qquad (10)$$

$$\Delta tcr = \frac{R - Rs}{\frac{dRs}{dt} - \frac{dR}{dt}}$$

$$Vs + \frac{dVs}{dt} \times \Delta tcv = V + \frac{dV}{dt} \times \Delta tcv \qquad (11)$$

$$\Delta tcv = \frac{V - Vs}{\frac{dVs}{dt} - \frac{dV}{dt}}$$

Then, controller 6 determines time $\Delta tc$ until a start of the deceleration control by a select-low operation between $\Delta tcr$ and $\Delta tcv$ as expressed by the following equation (12).

$$\Delta tc = \min\left[\frac{R - Rs}{\frac{dRs}{dt} - \frac{dR}{dt}}, \frac{V - Vs}{\frac{dVs}{dt} - \frac{dV}{dt}}\right]$$

Then, controller 6 determines a count Nc by dividing time $\Delta tc$ by calculation cycle T at S38. When, for example, $\Delta tc=40$ msec, and T=10 msec, then Np=4. At a step S39, controller 6 examines whether count Nc indicating the time remaining before a start of the deceleration control is smaller than count Np indicating the time remaining before a completion of the preload control. When Nc$\geq$Np, controller 6 considers that it is possible to complete the preload control operation by a start of the deceleration control operation, and proceeds to a step S40. At S40, controller 6 sets target deceleration Xg* to predetermined small deceleration XgPRE as in S33, and then proceeds to a step S45. When Nc<Np, controller 6 considers that it is not possible to complete the preload control operation by a start of the deceleration control operation, and proceeds from S39 to a step S41.

At S41, controller 6 examines whether a wheel cylinder pressure Pw is smaller than a predetermined pressure value PwMAX. When Pw$\geq$PwMAX, controller 6 considers that the preliminary pressure is too much, and proceeds to a step S40. When Pw<PwMAX, controller 6 considers that the preload pressure is within an allowable range, and proceeds to a step S42. At S42, controller 6 calculates target deceleration Xg* in accordance with Nc and Np so that target deceleration Xg* is greater than the normal target deceleration XgPRE according to the following equation (13). In this equation, k is a predetermined coefficient.

$$Xg^* = Xg_{PRE} + k(Np - Nc)/Nc \qquad (13)$$

At a step S43, controller 6 examines whether target deceleration Xg* is greater than a maximum value XgMAX for the preload control. When Xg*>XgMAX, controller 6 proceeds to a step S44, limits target deceleration Xg* to maximum value XgMAX (Xg*←XgMAX), and then proceeds to S45. When Xg*$\leq$XgMAX, controller 6 proceeds from S43 directly to S45.

At S45, controller 6 examines whether count Np indicating the time until the application of the preload pressure is reset to zero, or not. When Np>0, controller 6 considers that the generation of a preload pressure is not completed, and proceeds to S34. When Np=0, controller 6 considers that the generation of the preload pressure is complete, and proceeds to a step S46.

Figure 8:
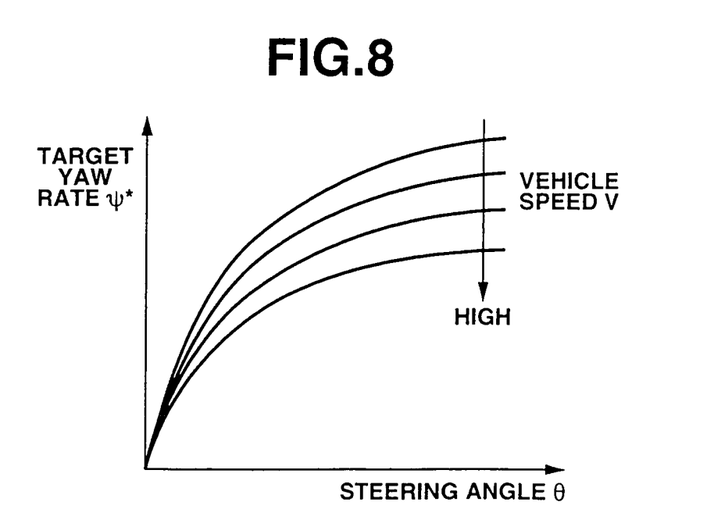
FIG. 8 is a graphic view showing a control map used for calculating a target yaw rate in the process of FIG. 6.

At S46, controller 6 examines whether the vehicle is in state having no oversteer tendency, and a driver's steering operation is directed to a neutral position. For the decision as to the oversteer tendency, controller 6 calculates a target yaw rate $\psi^*$ from turning speed V and steering angle $\theta$ according to a control map shown in FIG. 8, and compares a difference between the absolute value of target yaw rate $\psi^*$ and the absolute value of actual yaw rate $\psi$ with a predetermined value $\Delta\psi$. As shown in FIG. 8, target yaw rate $\psi^*$ increases as steering angle $\theta$ increases, and the rate of increase of target yaw rate $\psi^*$ is decreased as turning speed V increases. The predetermined value $\Delta\psi$ is a yaw rate deviation of an oversteer limit requiring no counter steering in the direction opposite to the turning direction. When $|\psi^*|-|\psi|\geq\Delta\psi$, controller 6 judges that the vehicle is in the state of oversteer tendency. When $|\psi^*|-|\psi|<\Delta\psi$, controller 6 judges that the vehicle is not in the state of oversteer tendency.

As to the decision of driver's steering operation toward the neutral position, controller 6 calculates a variation speed $d|\theta|/dt$ of the absolute value of steering angle $\theta$, and examines whether the variation speed of the absolute value of steering angle $\theta$ is smaller than zero (or negative). In this example, controller 6 compares the variation speed of the absolute value of steering angle with a negative value $\beta$ preliminarily determined with a slight margin to prevent misjudgment. When $d|\theta|/dt\geq\beta$, controller 6 considers the steering wheel is not rotated toward the neutral position. When $d|\theta|/dt<\beta$, controller 6 considers the steering wheel is rotated toward the neutral position.

When the vehicle is in the state of oversteering tendency, or when the driver's steering operation is not toward the neutral position ($|\psi^*|-|\psi|\geq\Delta\psi$ or $d|\theta|/dt\geq\beta$), controller 6 proceeds from S46 to a step S49 on the assumption that the turning condition is not in a state tending to shift away from the turning performance limit, and the preload control is appropriate. When, on the other hand, the vehicle is in the state having no oversteering tendency, and the driver's steering operation is toward the neutral position ($|\psi^*|-|\psi|<\Delta\psi$ and $d|\theta|/dt<\beta$), controller 6 proceeds from S46 to a step S47 on the assumption that the turning condition is in the state tending to shift away from the turning performance limit because of an increase in curvature radius of a curved road or an approach to the end of a curve, and the preload control before the deceleration control is not required.

At S47, controller 6 resets preload start flag Fp to zero. Then, controller 6 resets count Np to zero at a step S48 following S47, and terminates the preload pressure control process of FIG. 6. At S49 in the case of NO of S46, controller 6 examines whether an inclination of disc rotor 12 with respect to brake pads 13 is equal to a degree in a state of a straight ahead vehicle operation. Disc rotor 12 leans or inclines from the vertical toward the outside of a vehicle turning motion when the vehicle lateral acceleration increases. Therefore, in this example, controller 6 checks whether the vehicle lateral acceleration Yg is smaller than a predetermined value Yg1. When Yg$\geq$Yg1, controller 6 considers that the inclination of disc rotor 12 is not within a normal range of straight ahead operation, and proceeds to a step S34. When Yg<Yg1, controller considers that the inclination of disc rotor 12 is within the normal range of straight ahead operation, and proceeds to a step S47.

Figure 7:
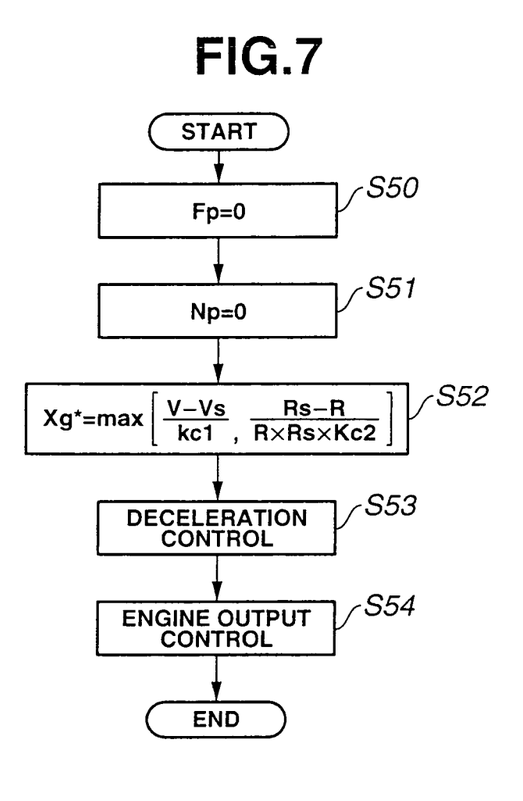
FIG. 7 is a flowchart showing a deceleration control process of a step S12 of FIG. 3.

FIG. 7 shows the deceleration control process of S12 in the form of a flowchart. At a step S50, control 6 resets preload start flag Fp to zero. At a next step S51, controller 6 resets count Np to zero. At a next step S52, controller 6 calculates target deceleration Xg* required for sustaining a stable turning operation according to the following equation (14), from the deviation of turning radius R from threshold Rs, and the deviation of turning speed V from threshold Vs. In equation (14), each of Kc1 and Kc2 is a predetermined coefficient.

$$Xg^* = \max\left[\frac{V-Vs}{Kc1}, \frac{Rs-R}{R \cdot Rs \cdot Kc2}\right] \qquad (14)$$

At a step S53 following S52, controller 6 calculates the target wheel cylinder pressure for each wheel cylinder required to achieve the calculated target deceleration Xg*, and controls the braking force control actuator 7 to perform the deceleration control to reduce the deviation of the actual wheel cylinder pressure from the target pressure. At a next step S54, controller 6 controls the engine output control actuator 8 so as to produce an optimum engine output to achieve target deceleration Xg*. Thereafter, controller 6 terminates the deceleration control process of FIG. 7.

The thus-constructed turning motion control system according to the illustrated embodiment is operated in the following manner. In the following explanation, turning speed V is taken as an example of the turning condition of the vehicle. When, for example, the vehicle is in a turning motion, and accelerator opening Acc is 0%, then the control system sets the deceleration start threshold (Vs in the case of turning speed V) to a normal value ($\sqrt{(R \times YgL)}$ in the case of turning speed V). The normal value ($\sqrt{(R \times YgL)}$) is set lower, by a predetermined amount or margin, than the turning performance limit, so that the automatic deceleration control is initiated before the turning limit is reached. (In the case of turning radius, the normal value ($V^2/YgL$) of the deceleration start threshold is set greater, by a predetermined amount or margin, than the turning performance limit, so that the automatic deceleration control is initiated before the turning limit is reached.) In this case in which Acc=0%, the deceleration start threshold Vs is equal to preload start threshold Vp.

Figure 9:
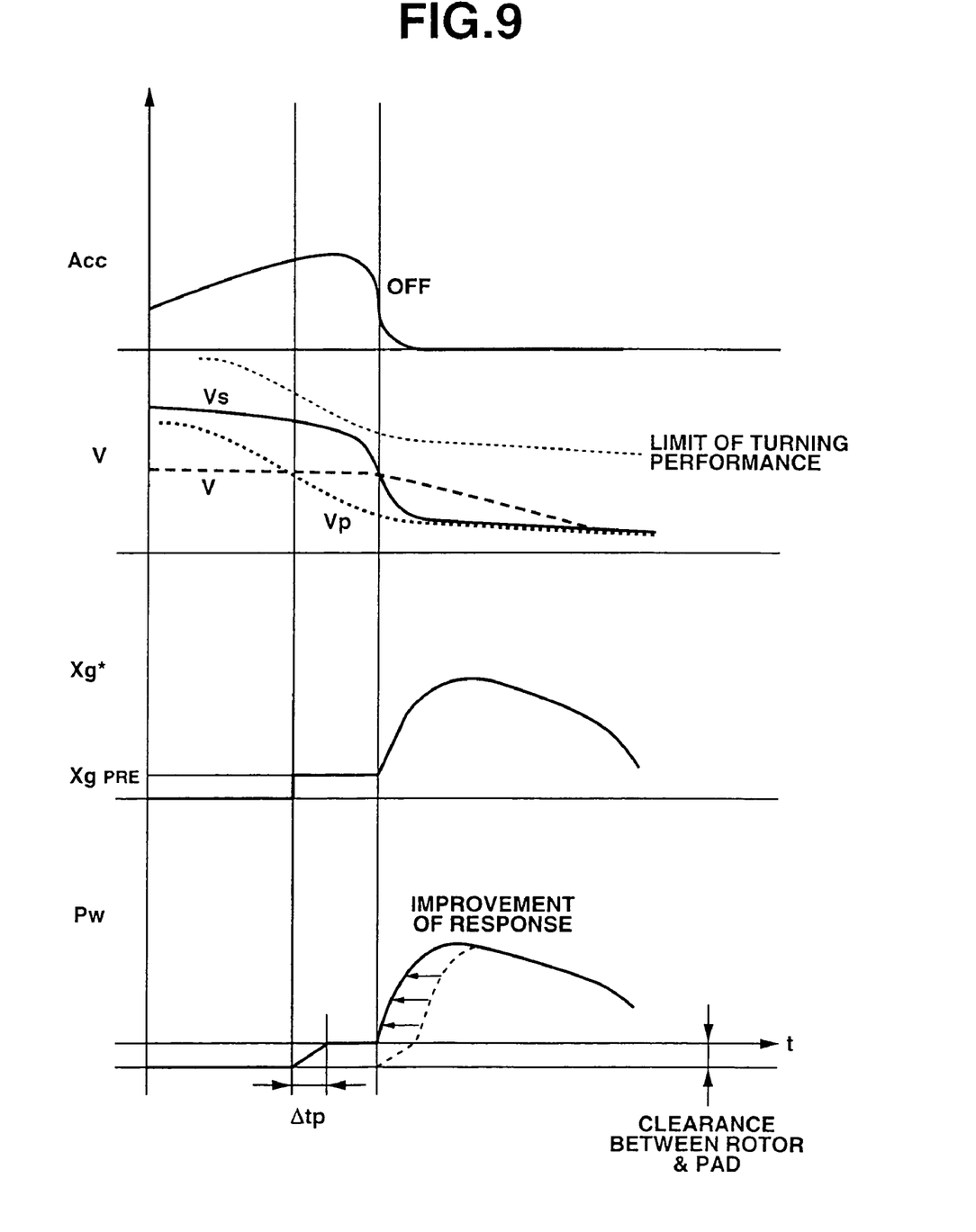
FIG. 9 is a time chart for illustrating effects of the control system according to the embodiment of the present invention.

While turning speed V is equal to or lower than deceleration start threshold Vs (=preload start threshold Vp) and the answer of S9 is NO, the control system considers that it is possible to maintain a stable turning operation, and there is no need for the automatic deceleration control, and puts braking force control actuator 7 in an inoperative state for allowing a brake fluid pressure to be supplied in a normal mode in accordance with the driver's braking operation to each of the wheel cylinders 11FL~11RR. When accelerator opening Acc is increased, the control system increases deceleration start threshold Vs by using the correction coefficient Ka, as shown in FIG. 9, from the normal value of deceleration start threshold Vs when accelerator opening is equal to 0%, and thereby makes the deceleration start threshold Vs closer to the turning performance limit thereby to restrict unwanted intervention of the automatic deceleration control and to allow the driver to approach the limit in conformity with the driver's accelerating intention.

When vehicle turning speed V becomes intermediate between Vp and Vs (that is, higher than Vp but lower than or equal to Vs) and the answers of S9 and S10 are both YES, then the control system sets target deceleration Xg* to the small deceleration value XgPRE for producing a preload pressure (S33), and drives braking force control actuator 7 in accordance with target deceleration Xg* (S34) to reduce the clearance or play between disc rotor 12 and brake pads 13 of each disc brake by spending a time length of dead time Δtp. There-fore, after the expiration of Δtp, the turning motion control system can start producing the braking force quickly and responsively for the deceleration control if accelerator opening Acc is decreased abruptly to 0% by the driver because of an increase of the curvature of the road, for example, and hence the target deceleration Xg* is increased sharply by crossing of turning speed V beyond deceleration start threshold Vs. Especially, in the case of a pump-up type actuator using pump 20 as a pressure source as in the illustrated embodiment, the response speed for producing a braking force is improved significantly.

The control system stops the generation of a preload pressure if it is judged that vehicle turning speed V will not exceed deceleration start threshold Vs at the end of Δtp (S28~S31). Therefore, the control system can avoid an undesired continuation of the preload control from completion of the generation of a preload pressure till a start of the deceleration control when the generation of a preload pressure is completed before a start of the deceleration control, to the advantage of the durability of braking force control actuator 7. Moreover, the control system increases the target deceleration Xg* from the normal value XgPRE (S38, S39, S42) if it is judged, by comparison between the estimated time Δtc, until a start fo the deceleration control and Δtp, that the automatic deceleration is started before the completion of a preload control operation to produce the preload pressure. Thus, the control system increases the drive current for pump 20 and hastens the generation of the preload pressure so as to be ready in time for a start of the deceleration control.

Figure 10:
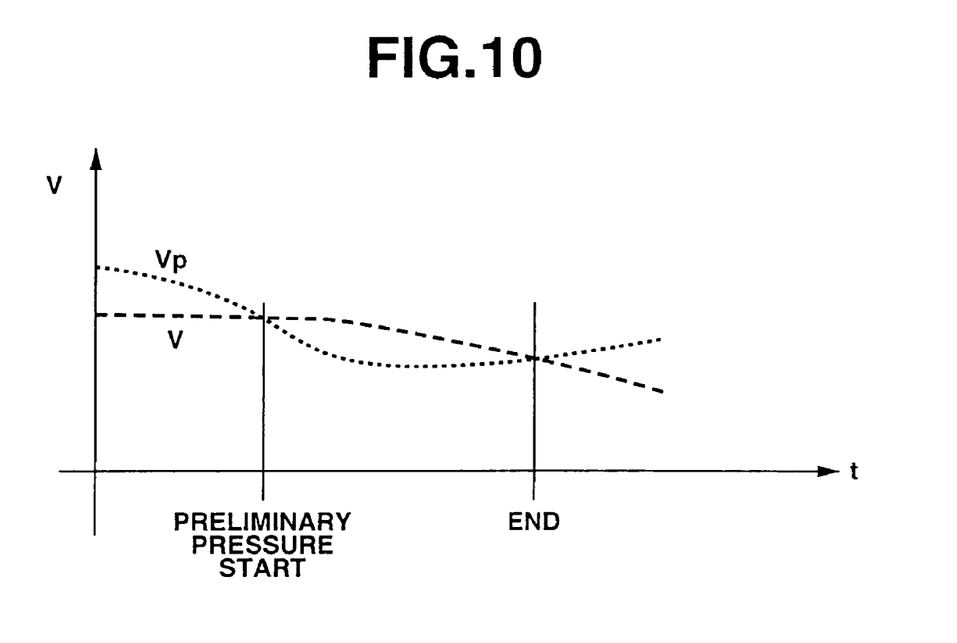
FIG. 10 is a graphic view for illustrating cancellation of the preload control of FIG. 6.

When, after the start of the preload control, the vehicle turning speed V decreases below preload start threshold Vp as shown in FIG. 10 (the answer of S9 is NO), the control system restores braking force control actuator 7 to the inoperative state, and cancels the preload control operation to avoid unnecessary preload pressure producing operation. When, after the completion of the preload pressure producing operation, it is judged that the vehicle is in a state having no oversteering tendency and the driver's steering operation is directed toward the neutral position (in the case of YES of S46), the control system restores braking force control actuator 7 to the inoperative state and cancel the preload control operation. In this case, the turning condition tends to move away from the turning performance limit because of an increase in the curvature radius, or an approach to the end of a curve, and therefore the preload control is not required. Thus, the control system can avoid unnecessary operation for producing a preload pressure to the advantage for the durability of braking force control actuator 7.

Figure 11:
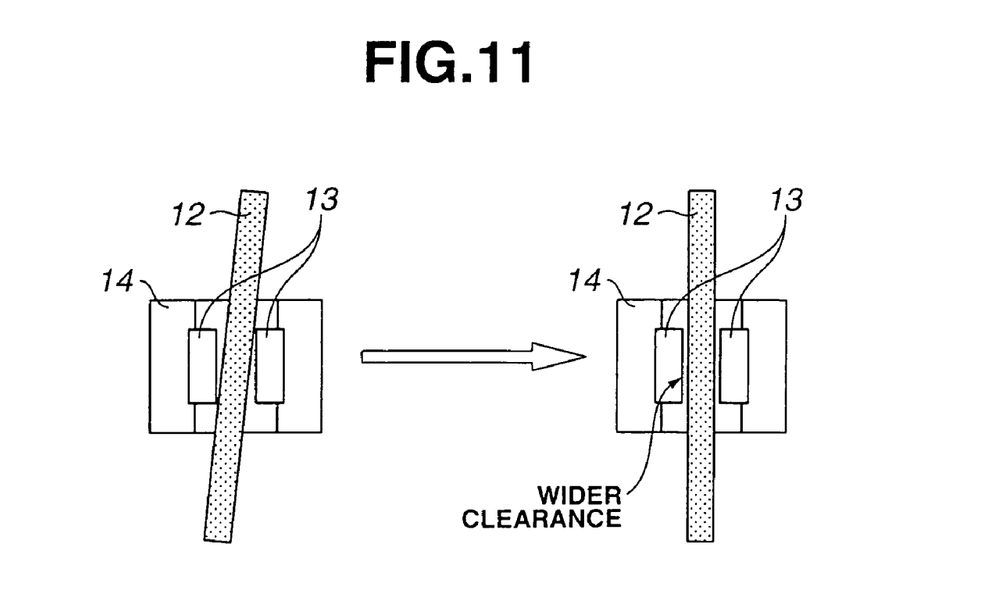
FIG. 11 is a view for illustrating an inclination of a brake disc rotor, monitored in the control process of FIG. 6.

When, after the completion of preload pressure producing operation, it is judged that the inclination of disc rotor 12 with respect to brake pads 13 is within a region in a state of straight ahead vehicle operation (the answer of S49 is YES), the control system restores braking force control actuator 7 to the inoperative state and cancels the preload control since the vehicle is in a state enabling a stable turning operation, and there is no need for the preload control. In this case, too, the control system can improve the durability of braking force control actuator 7. When the lateral acceleration Yg increases during a vehicle turning operation, disc rotor 12 leans toward the outside of the turn, and thereby pushes brake pads 13 wider apart, as shown in FIG. 11. Accordingly, the clearance between disc rotor 12 and each brake pad 13 is increased (knock back) when disc rotor 12 stands upright as in the straight ahead operation. Therefore, by canceling the preload pressure producing operation after disc rotor 12 is restored to the upright state in the straight ahead operation, the control system can avoid unnecessary operation of generating a preload pressure, and restrict the knock back to retain the already produced effect of the preload control.

If, after the execution of the preload control, vehicle turning speed V exceeds deceleration threshold Vs (and the answer of S10 become YES), the control system calculates target deceleration Xg* to sustain a stable turning motion (at S52), and performs the automatic deceleration control (at S53 and S54) by driving braking force control actuator 7 and engine output control actuator 8 in accordance with the calculated target deceleration Xg*. When thereafter the vehicle turning speed V decreases to a region lower than or equal to deceleration start threshold Vs but higher than preload start threshold Vp, the control system considers that a stable turning motion is feasible, terminates the automatic deceleration, and restarts the preload control for preparation of a next operation of the automatic deceleration. When turning speed V further decreases below preload start threshold Vp, the control system terminates the preload control.

In the present invention, it is optional to employ a drum brake instead of the disc brake employed in the illustrated embodiment. In the case of the drum brake, it is possible to omit step S49. In the preload control, the control system puts the pressure source of a pump and a power cylinder in a starting state, and reduces the clearance between a brake drum and a brake shoe. Moreover, it is optional to employ an air brake system using compressed air as transmission medium, instead of a hydraulic brake system. It is further optional to employ an electric brake arranged to translate rotary motion of an electric motor to linear motion and pressing a brake friction member onto a rotary member rotating as a unit with a wheel of a vehicle. Thus, the present invention is applicable to various brake systems inclusive of a brake system other than friction brake.

In the illustrated embodiment, the deceleration start thresholds Rs and Vs are varied continuously in a stepless manner in dependence on accelerator opening Acc in the process section of S4~S6. However, it is optional to change each threshold stepwise, or in a manner of step change, among two or more values in accordance with accelerator opening Acc. Moreover, it is optional to vary the rate of change of each threshold Rs and Vs in accordance with the rate of change of accelerator opening Acc.

In one of various possible interpretations, at least one of wheel rotation sensor 1, acceleration sensor 2 and steps S2 and S3 can serve as turning condition sensing means for sensing a turning condition of a vehicle. At least one of steps S10 and S12 and actuator 7 can serve as deceleration control means for decelerating the vehicle by starting a deceleration control when the turning condition crosses a deceleration start threshold from a first side to a second side of the deceleration start threshold which is set to have a margin for starting the deceleration control before a turning performance limit of the vehicle is reached. Accelerator sensor 4 can serve as accelerator input sensing means for sensing a driver's accelerator operation quantity. At least one of steps S4-S6 can serve as threshold adjusting means for varying the deceleration start threshold from a normal value toward the turning performance limit when the driver's accelerator operation quantity increases. Step S11 can serve as preload control means for starting a preload control to produce a preload when the turning condition crosses a preload start threshold from a first side to a second side of the preload start threshold.

This application is based on a prior Japanese Patent Application No. 2004-210157 filed on Jul. 16, 2004. The entire contents of this Japanese Patent Application No. 2004-210157 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle turning motion control apparatus for a vehicle comprising:
   a brake actuator configured to produce a braking force;
   a turning condition sensor configured to sense a turning condition of the vehicle;
   an accelerator operation quantity sensor configured to sense an accelerator operation quantity of a driver; and
   a controller configured,
      to start a deceleration control to produce the braking force with the brake actuator when the turning condition surpasses a deceleration start threshold which is set to start the deceleration control before a turning performance limit of the vehicle is reached,
      to vary the deceleration start threshold from a normal value toward the turning performance limit when the accelerator operation quantity increases, and
      to start a preload control to produce a preload before the deceleration control when the turning condition surpasses a preload start threshold which is set to the normal value even if the accelerator operation quantity increases.

2. The vehicle turning motion control apparatus as claimed in claim 1, wherein the controller is configured
   to set the deceleration start threshold to the normal value when there is no accelerator operation;
   to vary the deceleration start threshold from the normal value toward the turning performance limit as the accelerator operation quantity increases;
   to set the preload start threshold to the normal value of the deceleration start threshold even if the accelerator operation quantity is increased; and
   to start the preload control when the turning condition does not surpass the deceleration start threshold but the turning condition surpasses the preload start threshold.

3. The vehicle turning motion control apparatus as claimed in claim 2, wherein the controller is configured to cancel the preload control when the turning condition returns to a state not surpassing the preload start threshold.

4. The vehicle turning motion control apparatus as claimed in claim 1, wherein the controller is configured to cancel the preload control when the vehicle is in a state having no oversteer tendency, and a direction of a driver's steering operation is toward a neutral position.

5. The vehicle turning motion control apparatus as claimed in claim 1, wherein the brake actuator includes a disc brake including brake pads arranged to clamp a disc rotor rotating as a unit with a wheel of the vehicle; and wherein the controller is configured to produce the preload in the brake actuator by performing the preload control so as to reduce a clearance between the disc rotor and the brake pads, and to cancel the preload control when an inclination of the disc rotor with respect to the brake pads due to a lateral acceleration of the vehicle decreases to a state in a straight ahead vehicle operation.

6. The vehicle turning motion control apparatus as claimed in claim 1, wherein the controller is configured to cancel the preload control when a lateral acceleration of the vehicle decreases.

7. The vehicle turning motion control apparatus as claimed in claim 1, wherein the controller is configured to start the preload control when the turning condition crosses the preload start threshold from a first side to a second side of the preload start threshold, and thereby the turning condition shifts from a first region on the first side to a second region on the second side of the preload start threshold, and to cancel the preload control when the turning condition returns to the first region on the first side of the preload start threshold.

8. The vehicle turning motion control apparatus as claimed in claim 1, wherein the controller is configured to defer a start of the preload control if the preload control is to be completed before a start of the deceleration control.

9. The vehicle turning motion control apparatus as claimed in claim 1, wherein the controller is configured to increase the preload if the deceleration control is to be started before a completion of the preload control.

10. The vehicle turning motion control apparatus as claimed in claim 1, wherein the controller is configured
   to determine, as a parameter representing the turning condition, a first turning motion variable representing an actual turning radius of the vehicle, and a second turning motion variable representing an actual turning speed of the vehicle;
   to start the decelerating control when at least one of first and second conditions is met, the first condition being a condition which is met when the first turning motion variable representing the turning radius of the vehicle becomes smaller than a deceleration start radius threshold, the second condition being a condition which is met when the second turning motion variable representing the turning speed of the vehicle becomes higher than a deceleration start speed threshold;
   to decrease the deceleration start radius threshold from a greatest setting value, and increase the deceleration start speed threshold from a minimum setting value as the accelerator operation quantity increases; and
   to start the preload control before the deceleration control when at least one of third and fourth conditions is met, the third condition being a condition which is met when the first turning motion variable representing the turning radius becomes smaller than a preload start radius threshold which is set equal to the greatest setting value of the deceleration start radius threshold, the fourth condition being a condition which is met when the second turning motion variable representing the turning speed becomes higher than a preload start speed threshold which is set equal to the minimum setting value of the deceleration start speed threshold.

11. The vehicle turning motion control apparatus as claimed in claim 1, wherein the accelerator operation quantity sensor includes an accelerator position sensor to sense an accelerator position and to determine an accelerator opening as the accelerator operation quantity.

12. The vehicle turning motion control apparatus as claimed in claim 1, wherein the controller is configured to compare the turning condition with the deceleration start threshold and the preload start threshold, and to start the deceleration control in accordance with a result of comparison of the turning condition with the declaration start threshold and to start the preload control in accordance with a result of comparison of the turning condition with the preload start threshold.

13. The vehicle turning motion control apparatus as claimed in claim 1, wherein the turning condition comprises a turning radius of the vehicle, and the controller is configured
   to compare the turning radius with a deceleration start radius threshold,
   to start the deceleration control when the turning radius becomes smaller than the deceleration start radius threshold,
   to decrease the deceleration start radius threshold from a normal radius value toward the turning performance limit when an accelerator opening is increased by the driver,
   to compare the turning radius with a preload start radius threshold which is set to the normal radius value even if the accelerator opening is increased, and
   to start the preload control when the turning radius becomes smaller than the preload start radius threshold.

14. A vehicle turning motion control process for a vehicle, the vehicle turning motion control process comprising:
   sensing a turning condition of the vehicle;
   decelerating the vehicle by starting a deceleration control when the turning condition crosses a deceleration start threshold from a first side to a second side of the deceleration start threshold which is set to have a margin for starting the deceleration control before a turning performance limit of the vehicle is reached;
   varying the deceleration start threshold from a normal value toward the turning performance limit when a driver's accelerator operation quantity increases; and
   starting a preload control to produce a preload before the deceleration control when the turning condition crosses a preload start threshold from a first side to a second side of the preload start threshold which is set to the normal value even if the driver's accelerator operation quantity increases.

15. A vehicle turning motion control apparatus comprising:
   turning condition sensing means for sensing a turning condition of the vehicle;
   deceleration control means for decelerating the vehicle by starting a deceleration control when the turning condition crosses a deceleration start threshold from a first side to a second side of the deceleration start threshold which is set to have a margin for starting the deceleration control before a turning performance limit of the vehicle is reached;
   accelerator input sensing means for sensing a driver's accelerator operation quantity;
   threshold adjusting means for varying the deceleration start threshold from a normal value toward the turning performance limit when the driver's accelerator operation quantity increases; and
   preload control means for starting a preload control to produce a preload before the deceleration control when the turning condition crosses a preload start threshold from a first side to a second side of the preload start threshold which is set to the normal value even if the driver's accelerator operation quantity increases.

* * * * *